2,853,373

MOTOR FUEL

Archibald P. Stuart, Media, Pa., assignor to Sun Oil Company, Philadelphia, Pa., a corporation of New Jersey No Drawing. Application November 22, 1954
Serial No. 470,515

1 Claim. (Cl. 44—62)

This invention relates to improved internal combustion engine fuels, and is directed particularly to an improved internal combustion engine fuel containing a minor amount of a polymeric sulfone.

Internal combustion engines, i. e. compression ignition engines as well as spark ignition engines, accumulate carbonaceous deposits in the combustion chambers thereof during the course of normal engine operation. Such deposits are deleterious in that they increase engine wear, and in the case of spark ignition engines the deposits deleteriously affect engine knocking tendencies thereby causing higher octane fuel requirements. The carbonaceous deposits are derived largely from decomposition of the fuel and/or lubricant, although inorganic materials derived from the decomposition of various organometallic fuel or lubricant additives such as tetraethyl lead, iron carbonyl, and the like may also be contained in the deposits. In view of the deleterious effects of combustion chamber deposits, it is important and desirable to provide means by which the accumulation of such deposits may be reduced.

I have discovered that the accumulation of carbonaceous deposits in the combustion chambers of an internal combustion engine can be lessened by adding a minor amount of polymeric sulfone to the fuel used in said engine.

The polymeric sulfone used in this invention is formed by copolymerizing an olefin hydrocarbon with sulfur dioxide. It is preferred to use polymeric sulfones formed by copolymerizing an olefin hydrocarbon having at least 8 carbon atoms with sulfur dioxide in order that the resulting polymeric sulfone have high solubility in hydrocarbon fuel. Olefins having less carbon atoms may also be used to prepare the polymeric sulfone although additional means, e. g. dispersing agents, may be necessary in such cases in order to uniformly incorporate the resulting sulfone in the fuel. Normally olefins having about 8 to 24 carbon atoms are most desirable in preparing the sulfone which is used according to this invention. The olefins may be straight or branched chain; mixtures of olefins may be used. A preferred source of olefins comprises the dimer, trimer, or tetramer fractions resulting from the polymerization of mono-olefins such as ethylene, propylene and butylene; these mono-olefins may be obtained, for example, from various petroleum refining cracking operations. In addition to mono-olefins, diolefins can also successfully be used according to this invention, although care should be exercised during the diolefinsulfur dioxide copolymerization to avoid formation of insoluble, infusible cross-linked polymers.

Polymerizing procedures for the production of polymeric sulfones from olefin hydrocarbon and sulfur dioxide are known. A general description of polymeric sulfone preparation by polymerizing olefins and $SO_2$ can be found in a paper by R. D. Snow and F. E. Frey, Journal of Industrial and Engineering Chemistry, vol. 30, 1938, pages 176–182. Both high and low temperature techniques may be employed with use of excess olefin, excess $SO_2$, benzene, toluene, or the like as polymerization medium in preparing the polymeric sulfone used in this invention. High temperature polymerizations are conducted under elevated pressure. Temperatures of about 70° C. or less are suitable in high temperature polymerizations and it is generally preferred to use polymerization catalysts such as peroxides or nitrates in minor amount. Low temperature polymerizations are generally carried out at atmospheric pressure and at temperatures such that both the olefin and $SO_2$ exist as liquids. Photo polymerization techniques as well as use of polymerization catalysts as described above can be used in these low temperature polymerizations. Other techniques known in the art for producing polymeric sulfones may also be used in preparing the fuel additive according to this invention.

In general, polymeric sulfones having molecular weight in the range of about 5000 to 100,000 are most suitable for use according to this invention. Other molecular weight polymeric sulfones may on occasion be used.

In carrying out the present invention, polymeric sulfone is added to the fuel used in an internal combustion engine in minor amount sufficient to substantially lessen the accumulation of carbonaceous deposits in said engine. Normally the addition of about 0.01% to 5% by weight and preferably about 0.05% to 2% of polymeric sulfone to the fuel is sufficient to effect substantial deposit accumulation decreases. On occasion, however, amounts outside the above cited ranges may be advantageously used. Care must be exercised, however, to avoid substantial thickening of the fuel or lessening of the volatility thereof by the addition of unduly great amounts of polymeric sulfone.

This invention is applicable to both spark ignition and compression ignition engines. However, the advantages of the invention are more pronounced when used in a spark ignited engine since combustion chamber deposition normally has a greater deleterious effect therein.

The fuel to which polymeric sulfone is added may be any fuel which is normally used in an internal combustion engine, such as gasoline, kerosene, diesel fuel, or the like. The fuel may contain any of the known anti-knock or other additives in addition to the polymeric sulfone.

In order to illustrate a specific embodiment of the invention, propylene trimer is polymerized with $SO_2$ to produce a polymeric sulfone having a molecular weight of 5000. The above-produced polymeric sulfone is incorporated in gasoline in an amount equal to 2% by weight. When the resulting composition is used as a fuel in a spark ignition, internal combustion engine, the accumulation of combustion chamber deposits in such engine is substantially lessened as compared to the deposits observed when the same engine is operated under identical conditions with the same fuel except with the polymeric sulfone omitted.

The exact nature of the mechanism by which the accumulation of carbonaceous deposits is reduced by this invention is not definitely known. It is, however, theorized that the polymeric sulfone becomes incorporated in such carbonaceous deposits as are accumulated in the engine combustion chamber during engine operation. Under conditions in the combustion chamber during engine operation, the polymeric sulfones decompose to liberate gaseous $SO_2$ and olefin. This gaseous evolution of material contained in combustion chamber deposits is thought to loosen or break off the deposits from combustion chamber surfaces and thus enable the deposits to be exhausted from the chamber. Whatever the theoretical aspects, however, it remains that practice of the present invention results in a significantly decreased accumulation of engine combustion chamber deposits.

In addition to lessening combustion chamber deposit accumulation, the present invention is also efficacious in suppressing lead oxide catalyzed preignition tendencies in spark ignition engines using lead anti-knock agents. Lead additives such as tetra ethyl lead decompose in engine combustion chambers with a resulting incorporation of lead oxide in carbonaceous combustion chamber deposits. Such deposited lead oxide catalyzes glowing and burning of the carbonaceous deposits at lower temperatures and accordingly engine preignition difficulties are increased by this catalyzed deposit combustion. Through practice of this invention, however, the catalytic lead oxide is converted to lead sulfate by reaction with $SO_2$. $SO_2$ is liberated by decomposition of the polymeric sulfone as described above. Lead sulfate does not catalyze low temperature carbonaceous deposit ignition. Thus through practice of this invention, undesirable preignition tendencies are lessened in spark ignition engines using leaded fuel.

I claim:

Composition consisting essentially of an internal combustion engine fuel selected from the group consisting of gasoline and diesel fuel and a minor amount, sufficient to substantially lessen the accumulation of carbaceous deposits in the engine, of a polymeric sulfone having a molecular weight of from about 5,000 to about 100,000, said polymeric sulfone having been formed by copolymerizing olefin hydrocarbons having 8 to 24 carbon atoms per molecule with sulfur dioxide.

References Cited in the file of this patent

UNITED STATES PATENTS

| | | |
|---|---|---|
| 2,281,598 | Prutton | May 5, 1942 |
| 2,493,284 | Farkas | Jan. 3, 1950 |

OTHER REFERENCES

"Proceedings of the Royal Society of London," Barb, vol. 212A, 1952, page 79.